(12) United States Patent
Mampaey et al.

(10) Patent No.: US 12,049,073 B2
(45) Date of Patent: Jul. 30, 2024

(54) DIGITAL PRINTING PROCESS AND APPARATUS WITH IMPROVED LIQUID REMOVAL

(71) Applicant: XEIKON MANUFACTURING N.V., Lier (BE)

(72) Inventors: Kurt Gustaaf Maria Mampaey, Rumst (BE); Tomas Praet, Wespelaar (BE); Wouter Jeroom Maria Van Gaens, Duffel (BE); Werner Jozef Johan Op De Beeck, Putte (BE); Lode Erik Dries Deprez, Lier (BE)

(73) Assignee: XEIKON MANUFACTURING N.V., Lier (BE)

( * ) Notice: Subject to any disclaimer, the term of this patent is extended or adjusted under 35 U.S.C. 154(b) by 311 days.

(21) Appl. No.: 17/424,249

(22) PCT Filed: Feb. 10, 2020

(86) PCT No.: PCT/EP2020/053277
§ 371 (c)(1),
(2) Date: Jul. 20, 2021

(87) PCT Pub. No.: WO2020/161350
PCT Pub. Date: Aug. 13, 2020

(65) Prior Publication Data
US 2022/0063302 A1 Mar. 3, 2022

(30) Foreign Application Priority Data
Feb. 8, 2019 (NL) .................................. 2022531

(51) Int. Cl.
*B41J 11/00* (2006.01)
*B41M 5/00* (2006.01)
*B41M 7/00* (2006.01)

(52) U.S. Cl.
CPC ........ *B41J 11/002* (2013.01); *B41J 11/00216* (2021.01); *B41M 5/0047* (2013.01); *B41M 5/0064* (2013.01); *B41M 7/009* (2013.01)

(58) Field of Classification Search
CPC .............. B41J 11/002; B41J 11/00216; B41M 5/0047; B41M 5/0064; B41M 7/009
See application file for complete search history.

(56) References Cited

U.S. PATENT DOCUMENTS 7,651,212 B2 * 1/2010 Kadomatsu .......... B41J 11/0015
347/100
2006/0221166 A1 10/2006 Inoue
(Continued)

FOREIGN PATENT DOCUMENTS

| JP | 2009073027 A | 4/2009 |
| JP | 2017213847 A | 12/2017 |
| WO | 2017131072 A1 | 8/2017 |

OTHER PUBLICATIONS

International Search Report and Written Opinion for the International Patent Application No. PCT/EP2020/053277, mailed Mar. 18, 2020, 11 pages.

*Primary Examiner* — Geoffrey S Mruk
(74) *Attorney, Agent, or Firm* — KDW Firm PLLC

(57) ABSTRACT

A digital printing process for inkjet printing on a recording medium using ink including a carrier liquid and a colorant, in particular on a recording medium which is configured not to absorb the carrier liquid or to absorb only a portion of the carrier liquid during the inkjet printing. The process includes the steps of: jetting ink on the recording medium; bringing one or more continuously rotating members in rotational contact with the jetted ink on the recording medium such that a colorant-poor portion of the ink is adsorbed to the one or more rotating members and a colorant-rich portion remains on the recording medium. The colorant-rich portion (Continued)

includes more colorant than said colorant-poor portion. The process further includes continuously removing said colorant-poor portion of the one or more continuously rotating members.

22 Claims, 5 Drawing Sheets

(56) References Cited

U.S. PATENT DOCUMENTS

| | | |
|---|---|---|
| 2017/0217217 A1 | 8/2017 | Miyakoshi et al. |
| 2017/0232760 A1 | 8/2017 | Nishitani et al. |
| 2018/0311951 A1 | 11/2018 | Sakamoto et al. |
| 2019/0001710 A1 | 1/2019 | Hirokawa et al. |

* cited by examiner

DIGITAL PRINTING PROCESS AND APPARATUS WITH IMPROVED LIQUID REMOVAL

FIELD OF THE INVENTION

The present invention relates to a digital printing processes and to a digital printing apparatus for inkjet printing on a recording medium.

BACKGROUND

In inkjet printing methods, droplets of ink are projected onto a recording medium from a print head comprising a plurality of nozzles. The droplets adhere to the recording medium to form images.

It is desirable to print images not only on a high-absorptive recording media such as plain paper, but also on a non- or low-absorptive recording media such as polymer films (e.g. a non-liquid absorbing resin film such as a polyvinyl chloride resin film, a polypropylene resin film and a polyester resin film) or low-water absorbing coated paper or cardboard (e.g. offset coated paper).

It is known that when images are printed on a low-absorptive or non-absorptive recording medium using inkjet printing methods, problems tend to occur such as a prolonged drying time owing to slow absorption or no absorption of liquid components, and an insufficient rub-fastness in an initial period after printing.

To address these problems, existing solutions consist in using solvent-based pigment inks with an organic solvent as a dispersing medium or using UV-curable inks. When employing such inks, the pigment can be fixed in/on the substrate in an improved manner, resulting in a better rub-fastness of the printed images. However, these inks have a problem that either solvents are diffused in the air upon drying, or that initiators or polymerizable monomers used in the UV-curable ink jeopardize the safety. For this reason, typically water-based inks are preferred. On the other hand, typical conventional water-based pigment inks have a problem that they are incapable of forming images having a high image quality on a low- or non-absorptive substrate.

In such an inkjet recording apparatus where a liquid ink is used in which a colorant and additives are included in a solvent such as water, the ink liquid remains on the low-absorptive or non-absorptive recording medium after image formation. Typically, a heater or an absorbing member for absorbing the carrier liquid, and the like, are provided downstream of the inkjet head, in such a manner that the carrier liquid remaining on the recording medium after image formation is removed. However, often not all components of the ink, which are desirable to be removed, can be removed using such techniques. Moreover, when using heat-sensitive recording media, such as polymer substrates, typically only a limited amount of heating will be allowed.

SUMMARY

It is therefore an object of embodiments of the present invention to overcome problems associated with the known digital printing processes, preferably using water-based inks, thereby providing adequate print quality on the recording medium. Particular embodiments are intended to improve the removal of remaining components of the ink from the recording medium.

According to a first aspect of the invention there is provided a digital printing process for inkjet printing on a recording medium using ink comprising a carrier liquid and a colorant, in particular on a low- or non-absorptive recording medium, i.e. a recording medium which is configured not to absorb the carrier liquid or to absorb only a portion of the carrier liquid during the inkjet printing. The process comprises the steps of:

jetting ink on the recording medium;

bringing one or more continuously rotating members in rotational contact with the jetted ink on said recording medium, such that a colorant-poor portion of the ink is adsorbed to the one or more rotating members and a colorant-rich portion remains on the recording medium; said colorant-rich portion comprising more colorant than said colorant-poor portion; and continuously removing said colorant-poor portion of the one or more continuously rotating members.

Using one or more rotating members on which a portion of the jetted liquid is adsorbed has the advantage that ink liquid can be removed in a fast manner reducing or avoiding the need for any absorption steps and reducing or avoiding the need for long drying steps. Also, such an embodiment has the advantage of being simple and robust, whilst still allowing a fast and continuous printing process. A rotating member causes layer splitting, without the need for capillary action, to remove a portion of the jetted ink.

The separation between a colorant-rich portion and a colorant-poor portion may be achieved in any suitable manner. The ink and/or the recording medium and/or a primer or coating applied on the recording medium before the jetting may be chosen such that the colorant of the ink is precipitated and/or coagulated in or on the recording medium after the step of jetting and before the step of bringing the jetted ink in contact with one or more rotating members. In that manner, a colorant-rich portion is obtained near the surface of the recording medium and a colorant-poor portion is obtained above the colorant-rich portion. For example, the recording layer may be provided with a surface layer in/on which the colorant is caught or which causes the ink to coagulate. In addition or alternatively, the ink may comprise a coagulant agent or a film forming polymer. For example, the medium may be provided with a coating or primer before the jetting, or the medium may be pre-treated to cause the separation between a colorant-rich portion and a colorant-poor portion.

In another embodiment, there may be added a treatment unit before the one or more rotating members to cause the separation between a colorant-rich portion and a colorant-poor portion. For example, the jetted ink may be treated to cause a precipitation and/or a coagulation before the step of bringing the jetted ink in contact with one or more rotating members, such that a colorant-rich portion is obtained near the surface of the recording medium, with a colorant-poor portion above it.

According to an exemplary embodiment, the jetted ink is dried before bringing it in contact with the one or more rotating members in order to remove a first portion of the ink, whilst a second portion of the ink remains on the recording medium. Performing a preliminary drying step before the step of bringing the jetted ink in contact with the rotating member, may be advantageous to remove a first portion of the ink, whilst a further portion may then be removed by the one or more rotating members.

Preferably, the step of continuously removing of the colorant-poor portion of the one or more adsorbing rotating members is done by scraping the colorant-poor portion from said one or more adsorbing rotating members. Preferably, this is the only removing step that takes place. More preferably, the colorant-poor portion is removed from the one or more adsorbing rotating members by scraping without using suction. In that manner a well controlled layer-splitting can take place in the nip.

Preferably, the jetting of ink comprises jetting a first ink and a second different ink. The first ink comprises a first colorant and the second ink comprises a second colorant preferably different from the first colorant. The step of bringing one or more rotating members in rotational contact with the jetted ink may be done after the step of jetting the first ink and before the step of jetting the second ink, and/or after the step of jetting the second ink. In a possible embodiment, when the step of bringing one or more rotating members in rotational contact with the jetted ink is done after the step of jetting the first ink and before the step of jetting the second ink, sufficient liquid may be removed to allow the jetting of the second ink without disturbing the remaining colorant-rich portion of the first ink.

According to an exemplary embodiment, the process further comprises, before jetting the second ink, drying the jetted first ink in order to remove a first portion of the first ink, whilst a second portion of the first ink remains on the recording medium. The process may further comprise, before a step of bringing one or more rotating members in rotational contact with the second jetted ink, drying the jetted second ink in order to remove a first portion of the second ink, whilst a second portion of the second ink remains on the recording medium. The step of bringing one or more rotating members in rotational contact with the jetted ink may then be done after the step of drying the jetted first ink and before the step of jetting the second ink, and/or after the step of drying the jetted second ink. In other words, a colorant-poor portion of the dried first ink may be removed before jetting the second ink using one or more rotating members, and a further dried colorant-poor ink portion may be removed after jetting the second ink. In that manner some carrier liquid of the ink may be removed by drying and further carrier liquid (solvent, such as water and/or other components, such as humectants) of the ink may be removed by the rotating members.

Preferably, the drying is a non-contact drying, preferably a removal by evaporation, more preferably by radiation and/or by heating. In that manner the jetted image will not be disturbed by the drying. The drying may also be done as described in US patent with U.S. Pat. No. 10,150,230 using short light pulses. The content of U.S. Pat. No. 10,150,230 is included herein by reference.

According to an exemplary embodiment, the ink is a water-based ink comprising water, humectants and the colorant. The drying may then done such that water is removed, wherein preferable at least 50 wt %, more preferably at least 70 wt %, even more preferably at least 85 wt % of the water comprised in the jetted ink is removed during drying. In other words, if the carrier liquid comprises e.g. 70 wt % water, preferably at least 50 wt % of this 70 wt % is removed during drying. The bringing one or more rotating members in rotational contact with the jetted ink may be done such that humectants and optionally water are removed from the jetted ink, wherein at least 30 wt % of the humectants comprised in the ink, preferably at least 50 wt % of the humectants, are removed by the one or more rotating members.

According to an exemplary embodiment, the process further comprises the step of adding of an amount of a volatile liquid such that the volatile liquid is mixed with a portion of the jetted and optionally dried ink to form a liquid mixture. The volatile liquid is chosen to be more volatile than the portion of the jetted and optionally dried ink. The process further comprises the step of removing of a colorant-poor portion of the liquid mixture preferably using at least one rotating member of said one or more rotating members.

By adding volatile liquid, a liquid mixture is formed of the volatile liquid and a portion of the jetted and optionally dried ink. This mixture can be more easily removed, typically mechanically removed, such as by one or more rollers and/or by suction and/or blowing. As a result very little or no liquid remains on the surface of the recording medium. For water-based inks, this method allows removing any remaining liquid components, such as humectants, by the adding of volatile liquid and the further removal step. Thus, the efficiency of the removal step of liquid from the jetted ink on the recording medium is enhanced in a simple manner by adding volatile liquid and providing a further removal step.

The step of adding of an amount of a volatile liquid and removing of a portion of the liquid mixture may be done such that humectants are removed. More in particular, the volatile liquid may be chosen to mix well with the humectants.

According to a possible embodiment, the adding of an amount of a volatile liquid comprises adding an amount of volatile liquid on the jetted and optionally dried ink on the recording medium before bringing the at least one rotating member in rotational contact with the jetted and optionally dried ink. In that manner the liquid mixture is obtained on the recording medium. Also here, separation between a colorant-rich portion and a colorant-poor portion may be achieved in any suitable manner. For example, the volatile liquid may be chosen to cause or promote such a separation, e.g. by causing a coagulation. Also, the recording medium may be provided with a coating or may be pre-treated to cause or promote the separation between a colorant-rich portion and a colorant-poor portion. In another embodiment, there may be added a treatment unit to treat the jetted and optionally dried ink before and/or after adding the volatile liquid on the recording medium to cause the separation between a colorant-rich portion and a colorant-poor portion.

In addition or alternatively, the adding of an amount of a volatile liquid comprises bringing a rotating member of said one or more rotating members in rotational contact with the jetted and optionally dried ink on said recording medium such that a portion of the jetted and optionally dried ink is transferred from the recording medium to the rotating member, and adding an amount of the volatile liquid on the rotating member such that the volatile liquid is mixed with the transferred portion to form a liquid mixture on the rotating member, and removing said liquid mixture from the rotating member. By adding the volatile liquid on the rotating member, the removing of the liquid mixture can be done more easily compared to a case where the jetted colorant-poor ink portion has to be removed. Especially, when a water-based ink is used, and a large portion of the water has been removed in previous steps, the removed jetted colorant-poor ink portion may stick to the rotating member, and adding volatile liquid will allow for an improved removal and hence a more clean rotating member at the start of the nip.

According to an exemplary embodiment, the ink comprises humectants, and the volatile liquid has a boiling point being lower than the boiling point of the humectants of the ink, wherein the volatile liquid has a boiling point lower than 200° C.; and/or wherein the volatile liquid has a V value, as measured using the volatility test described in the description, above 20%, preferably above 30%, more preferably above 40%.

Preferably, the volatile liquid and the humectants are chemically substantially compatible to one another.

The volatile liquid may be e.g. any one of the following: water, alkanols and/or polyhydric alcohols, such as 1-2 propane diol, 1-2 hexane diol, glycerol (also called glycerine), alkyl ethers of alkanols and/or polyhydric alcohols, such as glycol ether and in particular Di-Ethylene Glycol Mono-Butyl Ether (DEGMBE). As mentioned above, also different volatile liquids may be used in subsequent steps.

According to an exemplary embodiment, the amount of added volatile liquid is at least 1 gsm, preferably at least 2 gsm, more preferably at least 5 gsm.

Preferably, the ink is a water-based ink comprising water, humectants and a colorant, and one or more first removal steps, e.g. by drying and/or by one or more rotating members, are done such that water is removed, more preferably a large portion of the water present in the ink, and the steps of adding of an amount of a volatile liquid and removing of a portion of the liquid mixture are done such that humectants are removed, more preferably a substantial part of the humectants. More preferably, at least 70 wt % of the water contained in the ink is removed before the step of adding the volatile liquid. Also, for example, by adding volatile liquid, and by removing the resulting mixture, at least 30 wt % of the humectants contained in the ink, preferably at least 50 wt % of the humectants, may be removed. This will result in a less "greasy" printed image containing a reduced amount of e.g. non- or less volatile components such as humectants or surfactants.

Jetted ink may be present on the whole surface of the recording medium, but may also be present on only some parts of the recording medium. Optionally, the adding of volatile liquid may be done in a patterned manner, e.g. more volatile liquid in the image areas and no or less volatile liquid in non-image areas.

Preferably, the removing comprises a mechanical removal of a portion of the liquid mixture. The mechanical removal of a portion of the liquid mixture may comprise bringing one or more rotating members in rotational contact with the liquid mixture on the recording medium, such that a portion thereof adheres to the one or more rotating members, and removing said portion from the one or more rotating members, e.g. by scraping said portion from said one or more rotating members. A scraping process is an effective and easy way of removing a liquid layer from a surface of the rotating member. By using a scraping element the removed mixture can be collected in a collecting container, from where it can be removed, or it can be completely or partly recycled.

In addition or alternatively, the mechanical removal of a portion of the liquid mixture may comprise a removal by suction and/or blowing.

Optionally, the removing may comprise a removal by evaporation, preferably by radiation and/or by heating. Preferably, such a removal by evaporation is done after the mechanical removal. More preferably, a substantial part of the removed liquid mixture is removed mechanically and only a minor part is removed by evaporation. For example, more than 95 wt % of the removed liquid mixture is removed mechanically and less than 5 wt % of the removed liquid mixture is removed by evaporation. Preferably, the evaporation of the volatile liquid can occur at an ambient temperature or at an operating temperature of a rotating member, i.e. preferably at least some volatile liquid evaporates in a temperature range between 20 and 30 degrees Celsius at atmospheric pressure. Additionally, the evaporation of the volatile liquid may be accelerated by means of heating and/or radiating the volatile liquid and/or by providing an air flow along an interface of the volatile liquid.

In the examples provided above one adding and removing step is described. However, it is also possible to provide multiple adding and removing steps, wherein such multiple steps may be performed with the same or with different volatile liquids.

Preferably, the ink and/or the recording medium are chosen such that a colorant of the ink is precipitated in or on the recording medium after jetting and before the adding of an amount of volatile liquid. To that end the recording layer may be provided with a surface layer in/on which the colorant is caught or which causes the ink to coagulate. In addition or alternatively, the ink may comprise a coagulant agent or a film forming polymer. In addition or alternatively, the jetted ink may be subjected to a pre-treatment before the adding of the volatile liquid to cause said precipitation.

According to an exemplary embodiment, the step of bringing at least one rotating member in rotational contact comprises bringing a plurality of rotating members subsequently in contact with jetted and optionally dried ink on the recording medium. By using multiple rotating members one after the other, the removal of colorant-poor ink portions can be done in steps. Optionally, a step may include the adding of a volatile liquid. The volatile liquid may be different for each step, and may be omitted for some or all steps. Also, optionally, there may be performed a pre-treatment of the jetted ink before the removal by a rotating member in order to cause the separation of the ink in a colorant-rich and a colorant-poor portion. Such a pre-treatment may be done before each step or before some steps. In yet other embodiments the recording medium may be subject to a pre-treatment.

According to a preferred embodiment, the step of removing of the colorant-poor portion of the one or more rotating members is done by scraping the colorant-poor portion from said one or more rotating members.

According to an exemplary embodiment, the ink and/or the recording medium are chosen such that the colorant of the ink is precipitated and/or coagulated in or on the recording medium after the step of jetting and before the step of bringing in contact with one or more rotating members.

According to a preferred embodiment, the recording medium is configured for substantially not absorbing the ink or for absorbing less than 5 wt % of the jetted ink during the described digital printing process. Exemplary embodiments of the invention will be especially suitable for recording media which substantially do not absorb ink, or which absorb the ink only to a limited extent. However, embodiments of the invention may also be used with absorbing recording media. When a water-based ink is used, the recording medium is preferably non-water absorbing or low-water absorbing.

The term "non-water absorbing" as used in the present specification is a concept that is intended to include both of very low-liquid absorbing properties and non-liquid absorbing properties, and it means that a water absorption of the recording medium is not more than 2.5 g/m$^2$ as measured under such a condition that a contact time between the recording medium and pure water is 100 milliseconds.

The term "low-water absorbing" as used in the present specification means that a water absorption of the recording medium is not more than 10 g/m$^2$ as measured under such a condition that a contact time between the recording medium and pure water is 100 milliseconds, preferably no more than 5 g/m².

In an exemplary embodiment, the recording medium may comprise a polymeric layer or polymeric substrate, such as a PE film or PET film, which substantially does not absorb the carrier liquid of the ink. Other examples are a PVC resin film, a PP resin film, a polyester resin film. The polymeric layer or polymeric substrate is commonly used for a recording medium as a base layer of the recording medium.

According to another aspect of the invention, there is provided a digital printing apparatus for inkjet printing on a recording medium. The apparatus comprises an inkjet head configured for jetting ink on the recording medium; one or more rotating members arranged downstream of said inkjet head and arranged to be in continuous rotational contact with jetted ink on the recording medium, such that a portion thereof is adsorbed on the one or more rotating members; and one or more removal devices arranged to remove said portion from the one or more rotating members.

According to an exemplary embodiment, the apparatus further comprises a drying means configured for drying the jetted ink in order to remove a first portion thereof, whilst a second portion of the ink remains on the recording medium, wherein the drying means is arranged upstream of the one or more rotating members.

According to an exemplary embodiment, the apparatus further comprises a second inkjet head configured for jetting a second ink on the recording medium.

According to an exemplary embodiment, the one or more rotating members comprise: one or more intermediate rotating members arranged downstream of the first inkjet head and upstream of the second inkjet head; and/or one or more downstream rotating members downstream of the second inkjet head.

According to an exemplary embodiment, the drying means may be arranged upstream of the second inkjet head and the apparatus may further comprise a second drying means configured for drying second jetted ink in order to remove a first portion thereof, whilst a second portion of the second ink remains on the recording medium. The second drying means may be arranged downstream of the second inkjet head and upstream of the one or more downstream rotating members.

According to an exemplary embodiment, the one or more rotating members comprise an intermediate rotating member downstream of the drying means and upstream of the second inkjet head, said intermediate rotating member rotating in rotational contact with the dried ink jetted by the inkjet head, such that a portion of the dried ink adheres to the intermediate rotating member; and wherein the one or more removal means comprise a removal means configured to remove said portion of the intermediate rotating member.

According to an exemplary embodiment, the inkjet head is configured for jetting a water-based ink comprising water, humectants and a colorant, and the drying means is configured to remove at least a portion of the water. Preferably, the drying means is a non-contact drying means.

According to an exemplary embodiment, the at least one rotating member comprises a plurality of rotating members arranged to be subsequently in contact with dried ink on the recording medium.

According to an exemplary embodiment, the apparatus further comprises a liquid application unit arranged and configured for adding of an amount of a volatile liquid to a portion of the jetted and optionally dried ink, such that the volatile liquid is mixed with said portion to form a liquid mixture, said volatile liquid being more volatile than the portion of the jetted and optionally dried ink.

In another exemplary embodiment, multiple liquid application units may be provided, e.g. a first liquid application unit for adding an amount of volatile liquid directly on the surface of the recording medium, and a second liquid application unit for adding an amount of volatile liquid onto the surface of a rotating member.

In an exemplary embodiment, the one or more rotating members are provided with an outer surface which is non-porous for the adsorbed portion of jetted ink. In that manner the adsorbed ink can be conveniently and continuously removed, e.g. using a scraper. For example, the one or more rotating members may be provided with a polyurethane coating.

In a preferred embodiment, the one or more removal devices comprise one or more scrapers and the one or more rotating rollers are adsorbing rotating rollers, i.e. rotating rollers which are non-porous for the carrier liquid of the ink. More preferably, the one or more removal devices are configured to remove the adsorbed portion of the jetted ink from the one or more rotating members without using suction.

Preferred embodiments of the apparatus are described in the appended claims. The features and technical advantages set out above for the process apply mutatis mutandis for the apparatus.

BRIEF DESCRIPTION OF FIGURES

The accompanying drawings are used to illustrate presently preferred non-limiting exemplary embodiments of the present invention. The above and other advantages of the features and objects of the invention will become more apparent and the invention will be better understood from the following detailed description when read in conjunction with the accompanying drawings, in which.

DETAILED DISCUSSION OF ILLUSTRATED EMBODIMENTS

Figure 1:
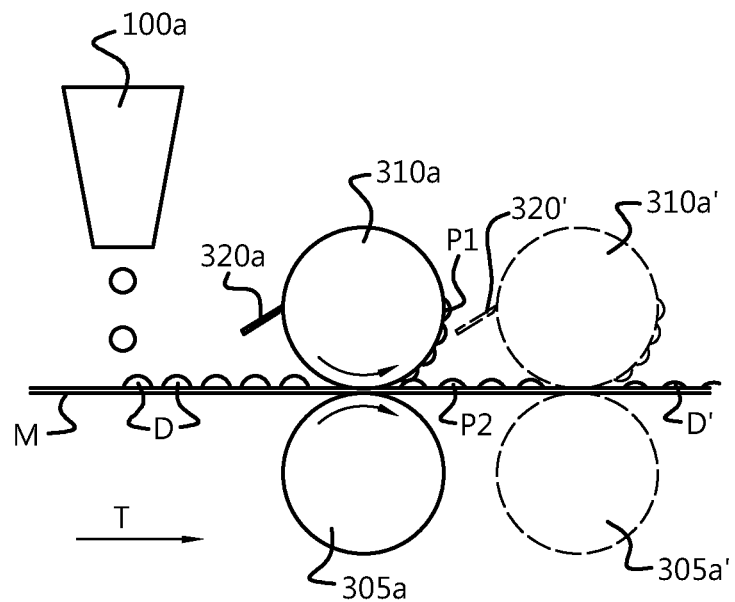
FIGS. 1 and 2 are schematic views illustrating an exemplary embodiment of digital printing process and apparatus with one inkjet head and with two inkjet heads, respectively.

The figures are not drawn to scale and purely diagrammatical in nature. Equal reference numerals in different figures refer to equal or corresponding features.

FIG. 1 illustrates a digital printing apparatus and process for inkjet printing on a recording medium M. The apparatus comprises an inkjet head 100a and one or more rotating members 310a, 310a'. The inkjet head 100a is configured for jetting ink on the recording medium M. The recording medium M moves continuously in a transport direction T through the printing apparatus. The ink comprises a carrier liquid and a colorant. The carrier liquid may be water based, but also other carrier liquids may be used. The colorant may be a pigment-based colouring material.

The one or more rotating members 310a, 310a' are arranged downstream of the inkjet head 100a. The one or more rotating members 310a, 310a' are arranged to be in continuous rotational contact with jetted ink on the recording medium M. As shown in FIG. 1, when the jetted ink passes in the nip between the recording medium M and the rotating member 310a, a colorant-poor portion P1 thereof adheres by adsorption to the rotating member 310a, and a colorant-rich portion P2 remains on the recording medium. This is achieved by layer splitting, without the need for capillary action. The separation between a colorant-rich portion and a colorant-poor portion may be achieved in any suitable manner. For example, the medium may be provided with a coating or may be pre-treated to cause the separation between a colorant-rich portion and a colorant-poor portion. In another embodiment, there may be provided a treatment unit between the inkjet head 100a and the first rotating member 310a to cause the separation between a colorant-rich portion and a colorant-poor portion. Further, the apparatus comprises a removal device 320a, 320a', e.g. a scraper, for each rotating member 310a, 310a'. The removal device 320a, 320a' is arranged to remove the colorant-poor portion from the corresponding rotating member 310a, 310a'. For each rotating member 310a, 310a' there may be provided an opposite rotating member 305a, 305a'. The rotating members 310a, 310a' are preferably rollers. The rotating members 305a, 305a' may be rollers or rotating belts. It is also possible to provide one rotating belt for supporting the recording medium M instead of two rollers 305a, 305a', but generally rollers are preferred in order to be able to support the pressure in the nip. Generally, a relatively low pressure is used. The pressure is determined so as to ensure a good contact along the entire width if the printed image.

The rotating member 310a, 310a' is positioned at a predetermined distance of the opposite rotating member 305a, 305a', such that a nip is formed in-between. The predetermined distance may be adjusted in function of the thickness of the droplets of jetted ink and in function of the thickness of the recording medium, such that the colorant-rich portion is not significantly disturbed. Preferably, seen in the nip, the rotating member 310a, 310a' is co-rotating with the opposite rotating member 305a, 305a', i.e. when the rotating member 310a, 310a' rotates counter-clockwise the opposite rotating member 305a, 305a' rotates clockwise. More preferably, the rotating speed is substantially the same, in order to avoid or limit any rubbing actions in the nip in order not to disturb the image. By using a plurality of rollers 310a, 310a' one after the other, the height of an ink droplet D can be gradually reduced, until only a colorant-rich flattened droplet D' is remaining. Optionally, the surface properties, and in particular the surface roughness, of the rotating members 310a, 310a' may be chosen so as to obtain a good adhering of the colorant-poor portion to the rotating members 310a, 310a'. Such choice may be dependent on the type of ink that is being used in the digital printing apparatus and/or on the type of recording medium.

Figure 2:
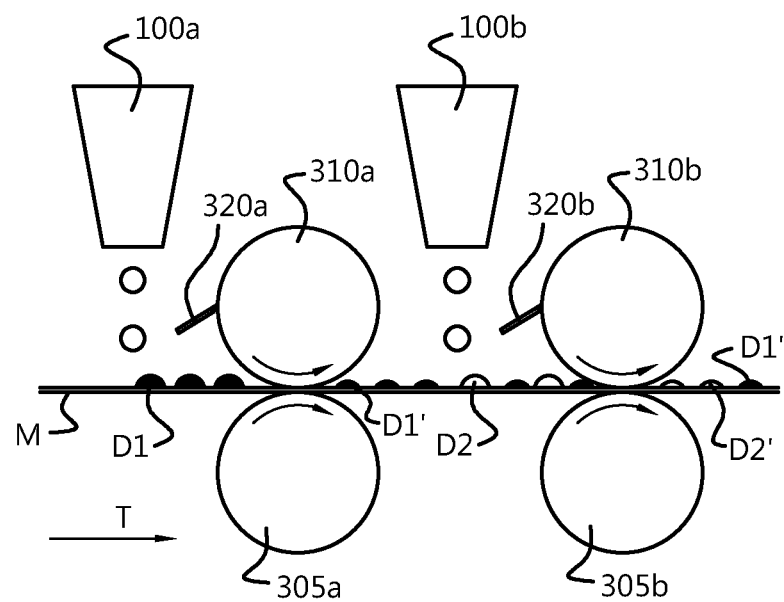

FIG. 2 illustrates a further exemplary embodiment. The digital printing apparatus comprises a first inkjet head 100a for jetting a first ink and a second inkjet head 100b arranged downstream of the first inkjet head for jetting a second ink, and a plurality of rotating members 310a, 310b. The rotating members 310a, 310b comprise an intermediate rotating member 310a arranged downstream of the first inkjet head 100a and upstream of the second inkjet head 100b, and a downstream rotating member downstream of the second inkjet head 100b. Further, the apparatus comprises a removal device 320a, 320b, e.g. a scraper, for each rotating member 310a, 310b. The removal device 320a, 320b is arranged to remove the colorant-poor portion from the corresponding rotating member 310a, 310b. By performing an intermediate removal step using rotating member 310a, the recording medium can be sufficiently "dry" to perform a second jetting step. With the rotating member 310a, the height of first ink droplets D1 can be reduced, such that colorant-rich flattened droplets D1' are remaining. Similarly, by using the rotating member 310b, the height of second ink droplets D2 can be reduced, such that colorant-rich flattened droplets D2' are remaining. Optionally there may be performed a final drying step (not shown) after all inkjet heads 100a, 100b and rotating members 310a, 310b. The rotating member 310a, 310a' and the opposite rotating member 305a, 305a' may be embodied as described above in connection with FIG. 1.

Figure 3:
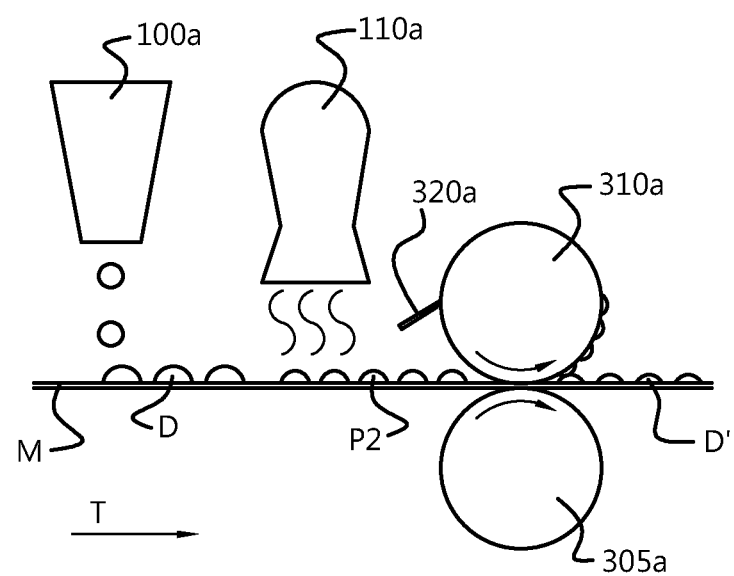
FIG. 3 is a schematic view illustrating an exemplary embodiment of digital printing process and apparatus with an inkjet head and a drying means.

FIG. 3 illustrates yet another exemplary embodiment which is similar to the embodiment of FIG. 1 with this difference that the apparatus further comprises a drying means 110a configured for drying the jetted ink D in order to remove a first portion thereof, whilst a second portion P2 of the ink remains on the recording medium M. The drying means 110a is arranged upstream of the one or more rotating members 310a.

In a possible embodiment, the inkjet head 100a is configured for jetting a water-based ink comprising water, humectants and a colorant. The drying means 110a may then be configured to remove at least a portion of the water. Preferably, the drying means 110a is a non-contact drying means, e.g. a heater such as an infrared heater. Preferable at least 50 wt %, more preferably at least 70 wt %, even more preferably at least 85 wt % of the water comprised in the jetted ink is removed during drying. Further, the bringing of the rotating member 310a in rotational contact with the jetted ink may be done such that humectants and optionally more water are removed from the jetted ink. Preferably at least 30 wt % of the humectants comprised in the ink, more preferably at least 50 wt % of the humectants, is removed by the one or more rotating members.

Figure 4:
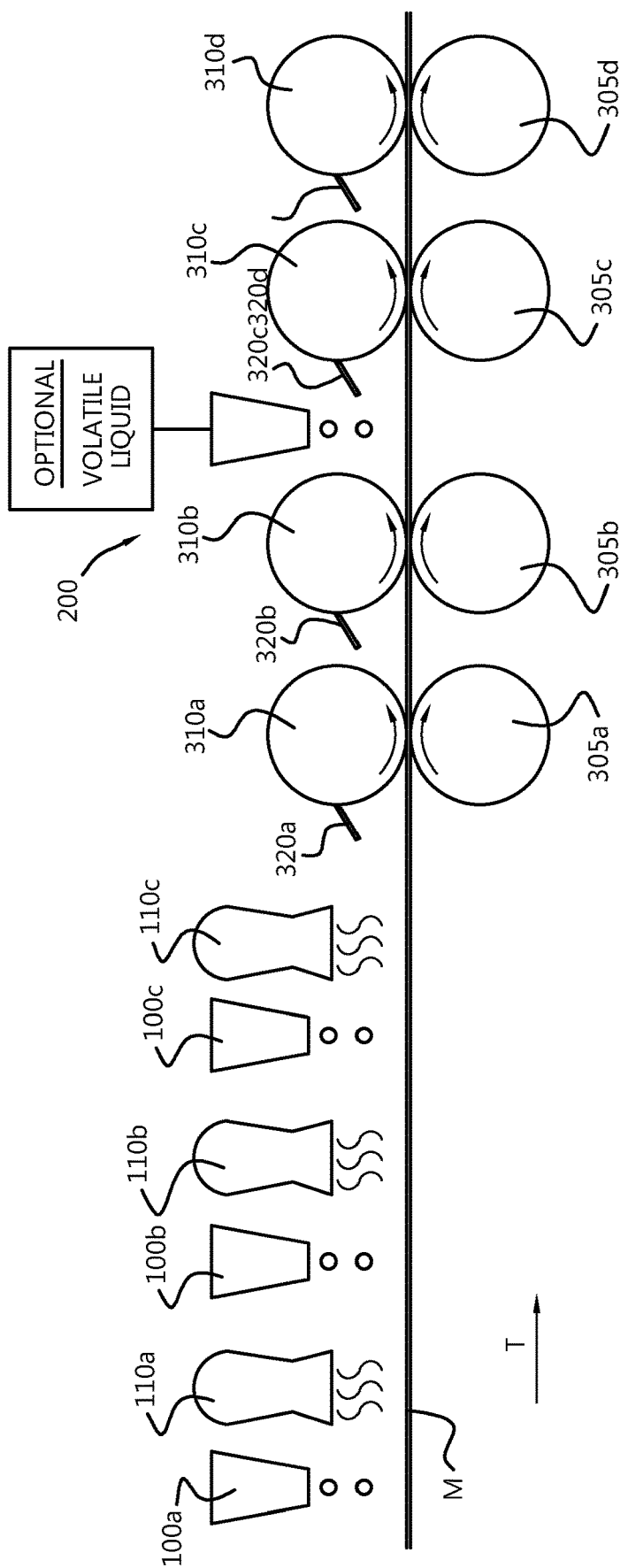
FIG. 4 is a schematic view illustrating an exemplary embodiment of digital printing process and apparatus with three inkjet heads and three corresponding drying means.

FIG. 4 illustrates a further exemplary embodiment of a digital printing apparatus with three inkjet heads 100a, 100b, 100c, arranged one after the other seen in a transport direction T of the recording medium. A first drying means 110a is arranged between the first inkjet head 100a and the second inkjet head 100b. A second drying means 110b is configured for drying second jetted ink and is arranged downstream of the second inkjet head 100b and upstream of the third inkjet head 100c. A third drying means 110c is configured for drying third jetted ink and is arranged downstream of the third inkjet head 100c and upstream of one or more downstream rotating members 310a, 310b, 310c, 310d. In other words, there is performed a drying step after each jetting step. Each drying step may be implemented as described above in connection with FIG. 3.

In the illustrated example of FIG. 4, the apparatus further comprises an optional liquid application unit 200 arranged and configured for adding of an amount of a volatile liquid to a portion of jetted and dried ink, such that the volatile liquid is mixed with said portion to form a liquid mixture. The volatile liquid is more volatile than the portion of jetted and dried ink. In the example, the volatile liquid application unit 200 is arranged downstream of two rotating members 310a, 310b and upstream of two further rotating members 310c, 310d. Rotating member 310c will remove a portion of the liquid mixture of the jetted dried ink and the volatile liquid, using the rotating members 310c, 310d. Optionally, rotating members 310b and 310d may be omitted.

The rotating members 310a, 310b, 310c, 310d, the opposite rotating member 305a, 305b, 305c, 305d, and the removal means 320a, 320b, 320c, 320d may be embodied as described above in connection with FIG. 1. Further, each drying step 110a, 110b, 110c may be implemented as described above in connection with FIG. 3.

Figure 6:
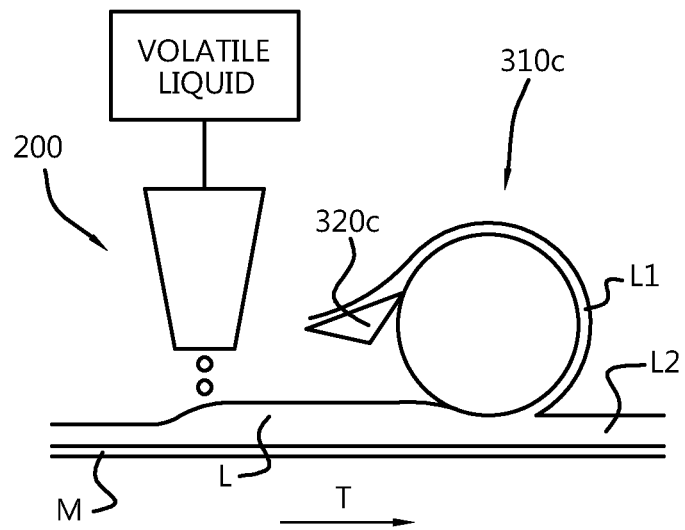
FIG. 6 is a schematic view illustrating a removal roller of the embodiment of FIG. 4 or 5.

Preferably, the step of adding of an amount of a volatile liquid and removing of a portion of the liquid mixture are done such that more humectants are removed. As shown in FIG. 4 and in FIG. 6, the adding of an amount of a volatile liquid may comprise adding an amount of volatile liquid on the jetted and dried ink on the recording medium M, before bringing at least one rotating member 310c in rotational contact with the jetted and dried ink. In an example, the liquid application unit 200 adds uniformly an amount of volatile liquid which may be at least 2 times, preferably at least 5 times, more preferably at least 10 times, and e.g. at least 20 times, the volume of jetted and optionally dried ink. The amount of added volatile liquid may be at least 1 gsm, preferably at least 2 gsm, more preferably at least 5 gsm. The one or more rotating members 310c, 310d are arranged to be in continuous rotational contact with the liquid mixture on the recording medium M. As shown in FIG. 6, when the liquid mixture layer L passes in the nip between the recording medium M and the rotating member 310a, a colorant-poor portion L1 thereof adheres by adsorption to the rotating member 310c, and a colorant-rich portion L2 remains on the recording medium. This is achieved by layer splitting, preferably without the need for capillary action. Optionally, in a last evaporating step (not shown), the remaining layer L2 may be further reduced by evaporating the volatile liquid. The evaporating step may be enhanced by actively radiating, in particular heating the recording medium M, such as by using an infrared light heater or using a contact heater.

Figure 7:
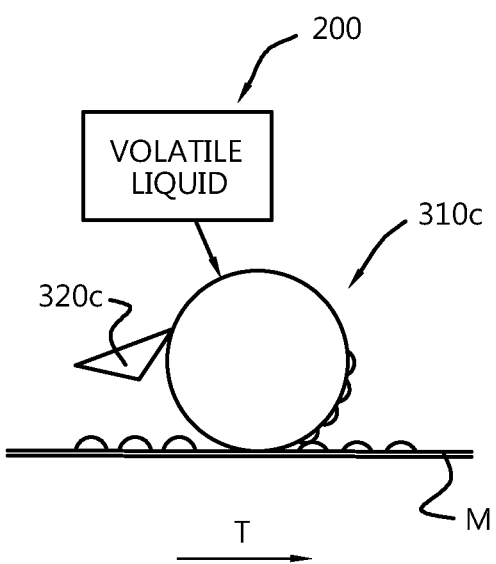
FIG. 7 is a schematic view illustrating another exemplary embodiment of a liquid application unit and a removal means.

FIG. 7 illustrates a variant of the embodiment of FIG. 6, illustrating that the adding of an amount of a volatile liquid may comprise bringing a rotating member 310c in rotational contact with the jetted and dried ink on said recording medium M such that a portion of the jetted and dried ink is transferred from the recording medium M to the rotating member 310c, and adding an amount of the volatile liquid on the rotating member 310c such that the volatile liquid is mixed with the transferred portion to form a liquid mixture on the rotating member, and removing said liquid mixture from the rotating member using a removal means 320c such as a scraper. By adding the volatile liquid, the scraping off can be improved, further improving the cleanness of the rotating member 310c when approaching the nip.

Figure 5:
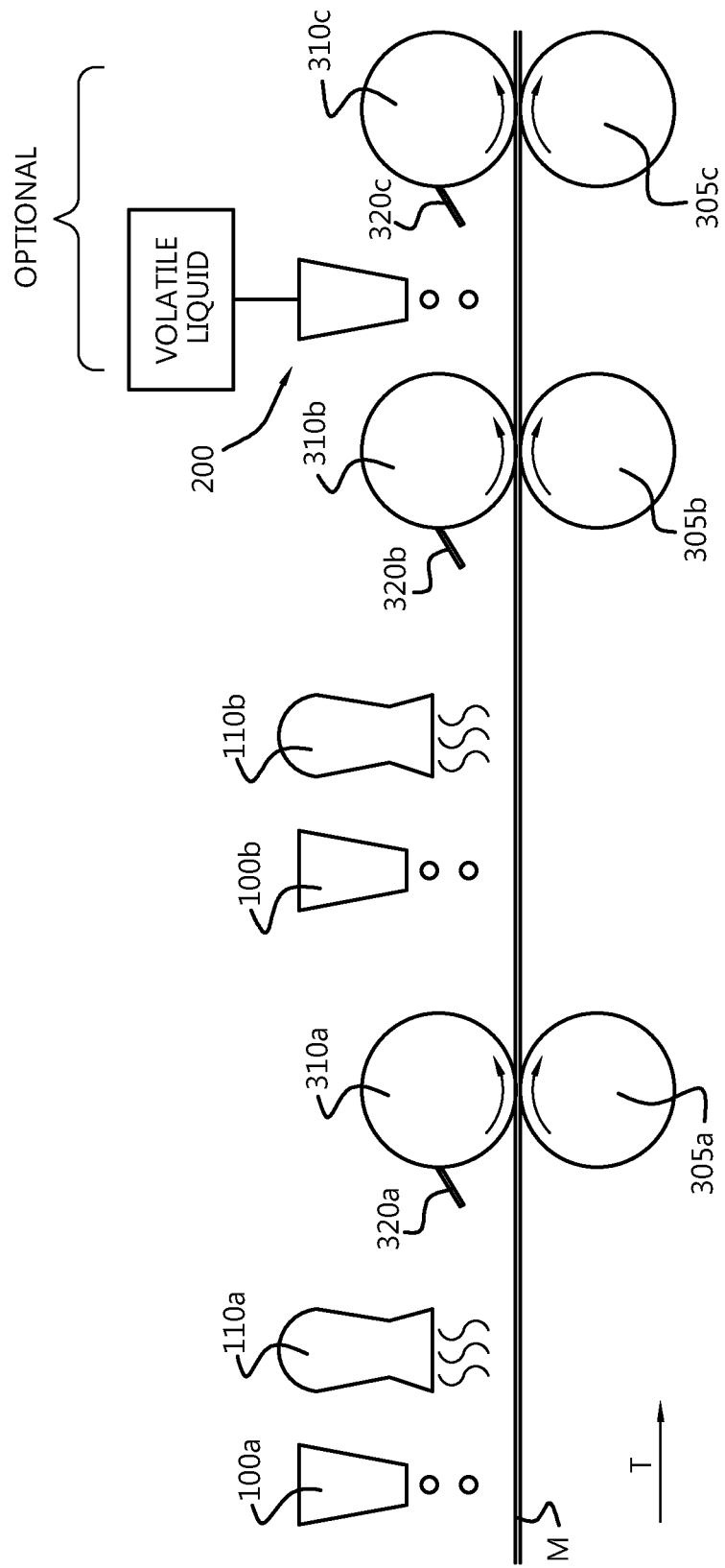
FIG. 5 is a schematic view illustrating another exemplary embodiment of digital printing process with multiple inkjet heads and drying means.

FIG. 5 illustrates yet another exemplary embodiment of a printing apparatus and process. The embodiment of FIG. 5 combines the principle of FIG. 3 with the principle of FIG. 4. More in particular, there is provided a first rotating member 310a between the first drying means 110a and the second inkjet head 100b, and there is provided a second rotating member 310b between the second drying means 110b and an optional volatile liquid application unit 200, followed by a third rotating member 310c. The characteristics and working principles set out above for FIGS. 3 and 4 are also valid for FIG. 5.

Particular embodiments of the invention relate to the field of digital printing apparatus and processes for so-called "continuous" webs, i.e. printing systems where a continuous roll of recording medium is run through the printer, in particular to print large numbers of copies of the same image(s), or alternatively, series of images, or even large sets of individually varying images. The digital printing apparatus may comprise to that end a feeding means configured to feed the recording medium M as a continuous web during printing. The resulting recording medium with the printed image may then be rolled on a roll.

Embodiments of the invention are particularly useful for water-based inks. A water based ink typically comprises the following components: water, a colorant, other water soluble solvents such as organic solvents, surfactants, a viscosity control agent, a buffer agent for controlling the pH, biocides, humectants, an anti-foam agent. Optionally, the ink may comprise polymeric particles and/or latex particles. Optionally, the ink may comprise UV monomers and/or oligomers and/or photo-initiators. A colorant may comprise a dye and/or a pigment. A pigment may comprise an inorganic pigment or an organic pigment. A pigment is typically dispersed in the ink using a polymeric dispersant. Other types of colorants are self dispersible pigments and encapsulated pigment dispersions where the pigment is encapsulated by the polymeric dispersant is a more irreversible way. Pigment may also be included in polymeric particles. The percentage of water in the water-based ink is preferably between 50 and 85 wt %.

Specific examples of the water-soluble organic solvent include (C1-C6) alkanols such as methanol, ethanol, propanol, isopropanol, butanol, isobutanol, secondary butanol, tertiary butanol, 1,2-hexanediol, 1,6-hexanediol, and trimethylolpropane; mono-, oligo-, or poly-alkylene glycols, or thioglycols having C2-C6 alkylene units such as ethylene glycol, diethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thiodiglycol, and dithiodiglycol; polyols (triols) such as glycerin, diglycerin, and hexane-1,2,6-triol; (C1-C4) alkyl ethers of polyhydric alcohol such as ethylene glycol monomethyl ether, ethylene glycol monoethyl ether, diethylene glycol monoethyl ether, diethylene glycol monobutyl ether (butyl carbitol), triethylene glycol monomethyl ether, triethylene glycol monoethyl ether, and triethylene glycol monobutyl ether; γ-butyrolactones and dimethylsulfoxides; and polyethylene glycols having a molecular weight of 400, 800, 1540, or more. One kind of these organic solvents may be used alone, or two or more kinds thereof may be used in combination.

In a possible embodiment, the ink may be a water-based ink comprising humectants. The volatile liquid used in embodiments of the invention may then have a boiling point lower than the boiling point of the humectants of the ink. Preferably, the volatile liquid has a boiling point lower than 200° C.; and/or the volatile liquid has a V value, as measured using the following volatility test, above 20%, preferably above 30%, more preferably above 40%.

Examples of humectants include polyols such as glycerin, ethylene glycol, diethylene glycol, triethylene glycol, tetraethylene glycol, polyethylene glycol, propylene glycol, polypropylene glycol, 1,3-propanediol, 1,4-butanediol, 1,5-pentanediol, 1,6-hexanediol, 1,2,6-hexanetriol, trimethylolpropane, and pentaerythritol; lactams such as 2-pyrrolidone, N-methyl-2-pyrrolidone, and -caprolactam; and 1,3-dimethylimidazolidine.

Although the invention can be advantageously used with water-based inks, it is also possible to use the method and apparatus of the invention in other inks, such as solvent-based pigment inks comprising organic solvents and UV-curing inks.

Volatility Test

To evaluate the degree of volatility of different liquids, the following test procedure is used:

Approximately 10 grams of liquid are added to a disposable aluminum cup. This cup is then put in an infrared heating cell (Mettler Toledo LJ16) for 25 minutes where a constant temperature of 90° C. is applied.

The infrared heating cell comprises an opening in the form of a grate in the top surface of the heating cell. This grate allows evaporated liquid to escape the heating cell, thereby inhibiting the condensation of the liquid on the surface of the heating cell after it has been evaporated.

The mass of liquid remaining in the cup after 25 minutes is measured by a balance provided within the heating cell. This weight measurement allows the mass of liquid that has evaporated within the 25 minutes period to be determined.

The weight loss value can then be used to calculate the percentage loss of liquid from the cup over the 25 minutes period:

$$V(\%) = \text{weight loss/original weight} \times 100.$$

The resultant percentage value V gives an indication of the volatility of the liquid.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination, and any advantageous combinations of such claims are herewith disclosed. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A digital printing process for inkjet printing on a recording medium using ink comprising a carrier liquid and a colorant, in particular on a recording medium which is configured not to absorb the carrier liquid or to absorb only a portion of the carrier liquid during the inkjet printing, wherein the ink is a water-based ink, said process comprising the steps of:
   jetting ink on the recording medium;
   bringing one or more continuously rotating members in rotational contact with the jetted ink on said recording medium, such that a colorant-poor portion of the ink is adsorbed to the one or more rotating members and a colorant-rich portion remains on the recording medium; said colorant-rich portion comprising more colorant than said colorant-poor portion; and
   continuously removing said colorant-poor portion of the one or more continuously rotating members.

2. The process according to claim 1, wherein the jetted ink is dried before bringing it in contact with the one or more rotating members in order to remove a first portion of the ink, whilst a second portion of the ink remains on the recording medium.

3. The process according to claim 1, wherein the ink and/or the recording medium and/or a primer or coating applied on the recording medium before the jetting are chosen such that the colorant of the ink is precipitated and/or coagulated in or on the recording medium after the step of jetting and before the step of bringing the jetted ink in contact with one or more rotating members.

4. The process according to claim 1, wherein the step of removing of the colorant-poor portion of the one or more rotating members is done by scraping the colorant-poor portion from said one or more rotating members.

5. The process according to claim 1, wherein the jetting of ink comprises jetting a first ink and a second different ink, wherein the step of bringing one or more rotating members in rotational contact with the jetted ink is done
   a. after the step of jetting the first ink and before the step of jetting the second ink, and/or
   b. after the step of jetting the second ink.

6. The process according to claim 1, wherein the jetting of ink comprises jetting a first ink and a second different ink, further comprising, before jetting the second ink, drying the jetted first ink in order to remove a first portion of the first ink, whilst a second portion of the first ink remains on the recording medium.

7. The process according to claim 6, wherein the ink is a water-based ink comprising water, humectants and the colorant, and wherein the drying is done such that water is removed, wherein at least 50 wt of the water comprised in the jetted ink is removed during drying; and/or wherein the drying is a non-contact drying.

8. The process according to claim 1, wherein the jetting of ink comprises jetting a first ink and a second different ink, further comprising, before a step of bringing one or more rotating members in rotational contact with the second jetted ink, drying the jetted second ink in order to remove a first portion of the second ink, whilst a second portion of the second ink remains on the recording medium.

9. The process according to claim 8, wherein the jetting of ink comprises jetting a first ink and a second different ink, wherein the step of bringing one or more rotating members in rotational contact with the jetted ink is done:
   a. after the step of jetting the first ink and before the step of jetting the second ink, and/or
   b. after the step of jetting the second ink; and
   wherein the step of bringing one or more rotating members in rotational contact with the jetted ink is done:
   c. after the step of drying the jetted first ink and before the step of jetting the second ink, and/or
   d. after the step of drying the jetted second ink.

10. The process according to claim 1, wherein the ink is a water-based ink comprising water, humectants and the colorant, and wherein the bringing one or more rotating members in rotational contact with the jetted ink is done such that humectants are removed from the jetted ink, wherein at least 30 wt % of the humectants comprised in the ink are removed by the one or more rotating members.

11. The process according to claim 1, further comprising the step of:
   adding of an amount of a volatile liquid such that the volatile liquid is mixed with a portion of the jetted and optionally dried ink to form a liquid mixture, said volatile liquid being more volatile than said portion of the jetted and optionally dried ink; and
   removing of a portion of the liquid mixture.

12. The process according to claim 11, wherein the adding of an amount of a volatile liquid comprises adding an amount of volatile liquid on the jetted and optionally dried ink on the recording medium before bringing the at least one rotating member in rotational contact with the jetted ink.

13. The process according to claim 11, wherein the adding of an amount of a volatile liquid comprises bringing a rotating member of said one or more rotating members in rotational contact with the jetted ink on said recording medium such that a portion of the jetted ink is transferred from the recording medium to the rotating member, and adding an amount of the volatile liquid on the rotating member such that the volatile liquid is mixed with the transferred portion to form a liquid mixture on the rotating member, and removing said liquid mixture from the rotating member.

14. The process according to claim 11, wherein the ink comprises humectants, and wherein the volatile liquid has a boiling point being lower than the boiling point of the humectants of the ink, wherein the volatile liquid has a boiling point lower than 200° C.; and/or wherein the volatile liquid has a V value, as measured using the volatility test described in the description, above 20%.

15. The process according to claim 11, wherein the amount of added volatile liquid is at least 1 gsm.

16. The process according to claim 1,
wherein the ink is a water-based ink comprising water, humectants and the colorant, and wherein the bringing one or more rotating members in rotational contact with the jetted ink is done such that humectants are removed from the jetted ink, wherein at least 30 wt % of the humectants comprised in the ink are removed by the one or more rotating members,
the process further comprising the steps of:
adding of an amount of a volatile liquid such that the volatile liquid is mixed with a portion of the jetted and optionally dried ink to form a liquid mixture, said volatile liquid being more volatile than said portion of the jetted and optionally dried ink; and
removing of a portion of the liquid mixture,
wherein the step of adding of an amount of a volatile liquid and removing of a portion of the liquid mixture are done such that humectants are removed.

17. The process according to claim 1, wherein the step of bringing at least one rotating member in rotational contact comprises bringing a plurality of rotating members subsequently in contact with jetted ink on the recording medium.

18. A digital printing apparatus for inkjet printing on a recording medium, said apparatus comprising:
an inkjet head configured for jetting ink on the recording medium;
downstream of said ink jet head, one or more rotating members arranged to be in continuous rotational contact with jetted ink on the recording medium, such that a portion thereof is adsorbed on the one or more rotating members; and
one or more removal devices arranged to remove said portion from the one or more rotating members.

19. The apparatus according to claim 18, further comprising a drying means configured for drying the jetted ink in order to remove a first portion thereof, whilst a second portion of the ink remains on the recording medium, wherein the drying means is arranged upstream of the one or more rotating members.

20. The apparatus according to claim 18, further comprising a second inkjet head (100b) configured for jetting a second ink on the recording medium, wherein the one or more rotating members comprise:
e. one or more intermediate rotating members arranged downstream of the first inkjet head and upstream of the second inkjet head; and/or
f. one or more downstream rotating members downstream of the second inkjet head.

21. The apparatus according to claim 18, wherein the one or more removal devices comprise one or more scrapers and wherein the one or more removal devices are configured to remove the adsorbed portion of the jetted ink from the one or more rotating members without using suction.

22. A digital printing process for inkjet printing on a recording medium using ink comprising a carrier liquid and a colorant, in particular on a recording medium which is configured not to absorb the carrier liquid or to absorb only a portion of the carrier liquid during the inkjet printing, said process comprising the steps of:
jetting ink on the recording medium;
bringing one or more continuously rotating members in rotational contact with the jetted ink on said recording medium, such that a colorant-poor portion of the ink is adsorbed to the one or more rotating members and a colorant-rich portion remains on the recording medium; said colorant-rich portion comprising more colorant than said colorant-poor portion; and
continuously removing said colorant-poor portion of the one or more continuously rotating members;
wherein the step of removing of the colorant-poor portion of the one or more rotating members is done by scraping the colorant-poor portion from said one or more rotating members, without using suction.

* * * * *